United States Patent [19]

Perratone et al.

[11] Patent Number: 4,635,971
[45] Date of Patent: Jan. 13, 1987

[54] ROTATABLE PIPE COUPLING FOR A PLURALITY OF INCOMING AND A PLURALITY OF OUTGOING PIPES

[75] Inventors: René Perratone, Menton; Leendert Poldervaart, La Turbie, both of France

[73] Assignee: Single Buoy Moorings Inc., Marly, Switzerland

[21] Appl. No.: 654,094

[22] Filed: Sep. 24, 1984

[30] Foreign Application Priority Data

Sep. 23, 1983 [NL] Netherlands ............................ 8303278

[51] Int. Cl.⁴ ............................................. F16L 39/04
[52] U.S. Cl. ....................................... 285/134; 285/351
[58] Field of Search ................. 285/134, 136, 190, 351

[56] References Cited

U.S. PATENT DOCUMENTS

| 2,781,134 | 2/1957 | Weir et al. | 285/136 X |
| 2,820,650 | 1/1958 | Leopold . | |
| 3,237,220 | 3/1966 | Brandt | 285/134 X |
| 3,648,311 | 3/1972 | Voss | 285/134 X |
| 4,126,336 | 11/1978 | Ortloff et al. | 285/190 X |
| 4,280,720 | 7/1981 | Lomenech et al. | 285/136 |
| 4,288,106 | 9/1981 | Foolen | 285/190 X |
| 4,405,162 | 9/1983 | Williams | 285/136 X |
| 4,441,522 | 4/1984 | Griffin | 285/136 X |

FOREIGN PATENT DOCUMENTS

| 1061827 | 9/1979 | Canada . | |
| 2911000 | 10/1980 | Fed. Rep. of Germany . | |
| 3016589 | 11/1981 | Fed. Rep. of Germany . | |
| 73876 | 1/1954 | Netherlands . | |
| 709909 | 1/1980 | U.S.S.R. | 285/136 |

*Primary Examiner*—Dave W. Arola
*Attorney, Agent, or Firm*—Young & Thompson

[57] ABSTRACT

The invention relates to a rotatable pipe coupling for a plurality of pipes comprising a plurality of annular bodies (1,2,3) which are concentric and in interfitted relation with respect to one another instead of being stacked upon each other.

5 Claims, 7 Drawing Figures

ROTATABLE PIPE COUPLING FOR A PLURALITY OF INCOMING AND A PLURALITY OF OUTGOING PIPES

The invention relates to a rotatable pipe coupling for a plurality of incoming and a plurality of outgoing pipes, which consists of a stationary annular body having a plurality of pipe connections, a second annular body disposed concentrically thereto and having a plurality of pipe connections, these bodies being sealingly connected to one another by their mutually facing surfaces, while at least one of them is provided with a plurality of annular recesses forming circumferential channels in which incoming and outgoing pipes have their mouths and which are separated from one another by sealing rings.

A pipe coupling of this kind is known, for example, from U.S. Pat. No. 4,288,106. This known pipe coupling comprises, for each incoming and outgoing pipe, an inside ring and an outside ring, each of which is fastened respectively to the inner ring and outer ring of a bearing. In the case of a plurality of incoming and outgoing pipes, a plurality of such pairs of concentric pipes are stacked one on the other, and all the inside rings and outside rings are respectively coupled to one another, while the bearings are disposed between the successive sets of annular bodies. From this publication (FIG. 4) a rotatable pipe coupling is also known in which each outermost annular body is provided with a plurality of circumferential channels and each innermost annular body is correspondingly provided with a plurality of pipe connections at the respective levels of the circumferential channels. In this coupling also the sets of annular bodies lie one on the other. This known rotatable pipe coupling constitutes an improvement on pipe couplings of the type illustrated, for example, in U.S. Pat. No. 4,126,336, which type has a very great overall height, while for the purposes of maintenance or repair the entire pipe coupling must be put out of operation. The pipe coupling according to this U.S. Pat. No. 4,288,106 has a lower height and is more easily accessible for servicing or repair because a set of annular bodies can be removed from the stack without the connections of the other bodies needing to be broken. The large dimensions and accordingly great weights of couplings of this type, such as are used in mooring devices, have however the consequence that with a still reasonably great overall height the removal of a set of annular bodies from the stack is a very difficult operation which is not without danger. Known rotatable pipe couplings, such as are used on mooring buoys or like, have a height of 2 to 3 meters or more.

The aim of the invention is now to provide a rotatable pipe coupling whose overall height can be considerably less, and with which maintenance or repair can be carried out in a simpler manner.

According to the invention, this aim is achieved in that the coupling consists of more than two annular bodies, all of them concentric relative to one another and having annular channels at the contact surfaces, together with sealing rings separating these channels from one another.

Instead of stacking on one another sets of annular bodies having circumferential channels and incoming and outgoing pipes, according to the invention all the annular bodies are disposed concentrically one within the other, a stationary body preferably alternating with a body which is rotatable relative to it.

The incoming and outgoing pipes can be connected in any suitable manner to the various annular bodies, but it is preferable for one or more of the annular bodies to be provided with axial bores which, by way of transverse channels, lead out at different levels into annular channels formed between the bodies. In this way very compact rotatable pipe couplings can be formed, whose height is slight because on a number of concentric annular bodies it is possible to make pipe connections which are in communication either with the outermost ring connected thereto or with the innermost ring connected thereto, that is to say with the annular channels provided therein.

According to the invention, it is helpful for one or more of the annular bodies to be provided at the site of one or more seals with removable parts giving access to the packings. It is thus possible to repair leaking seals in a simple manner without extensive dismantling operations being required.

It is best for the outer ring and/or the inner ring to be divisible or to be composed of rings clamped on one another by means of axial bolts.

The invention will now be explained with the aid of the drawings.

Figure 1:
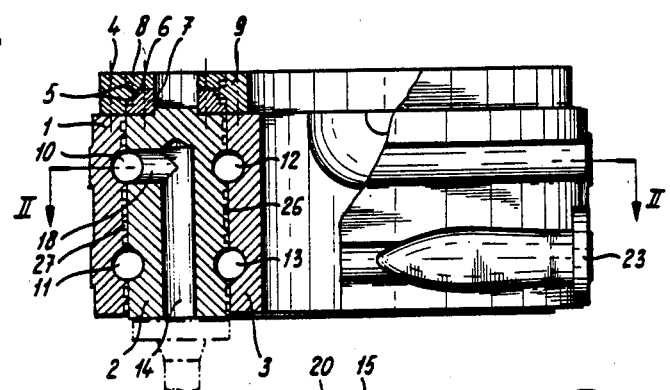
FIG. 1 is a section on the line I—I in FIG. 2 of a possible form of construction of the coupling according to the invention, and shows the same also partly in elevation.
Figure 2:
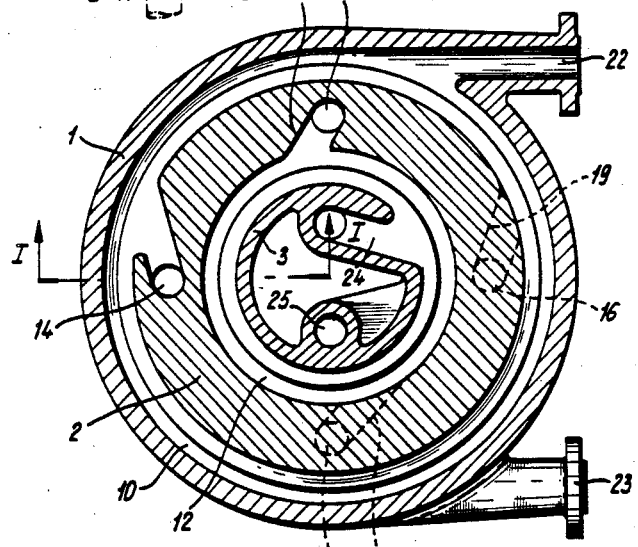
FIG. 2 is a section on the line II—II in FIG. 1.

The pipe coupling shown in FIGS. 1 and 2 consists of an outermost annular body 1, which is rotatable about a stationary annular body 2, in the interior of which a rotatable body 3 is disposed.

At the top of the outer ring 1 is disposed the outer ring 4 of e.g. an axial-radial roller bearing having rollers 5 for the axial load and rollers 6 for the radial load, although other types of bearings are also possible. On the stationary ring 2 is fastened the inner ring of the bearing, this ring consisting of two parts 7 and 8.

On the innermost ring 3 of the pipe coupling is fastened the inner ring 9 of a correspnding axial-radial bearing, of which the outer ring, likewise consisting of two parts, is fastened on the stationary annular body 2.

In all the annular bodies circumferential recesses are made in order to form the circumferential channels 10, 11, 12 and 13.

The stationary ring 2 of the pipe coupling has four pipe connections in the form of vertical bores 14, 15, 16 and 17. The vertical bore 14 has a transverse connection 18 to the circumferential channel 10 between the outer ring 1 and the inner ring 2.

The vertical bore 16 lying diametrically opposite has a connection 19 to the circumferential channel 11 between the outer ring 1 and the stationary ring 2. The vertical channel 15 has a transverse connection 20 to the circumferential channel 12 between the inner ring 3 and the stationary ring 2, and the vertical channel 17 has a transverse connection 21 to the circumferential channel 13 between the inner ring 3 and the stationary ring 2.

The annular channel 10 has a pipe connection 22, as shown in FIG. 2, and the circumferential channel 11 has a corresponding connection 23.

The circumferential channels 12 and 13 are in communication, via inwardly and upwardly directed elbow-shaped channels 24, 25, with axial connections (not shown).

26 and 27 designate the annular recesses in which sealing rings are disposed.

The pipe coupling shown in FIGS. 1 and 2 has four inlet and four outlet connections. If, for example, the sealing rings 27 between the outer ring 1 and the inner ring 2 should be destroyed, the outer ring 1 can be removed axially after dismantling the bearing by removing the ring 8, and after the pipe connections at 22 and 23 have been uncoupled. The operation of the part of the coupling between the stationary ring 2 and the inner ring 3 is not disturbed thereby.

Figure 3:
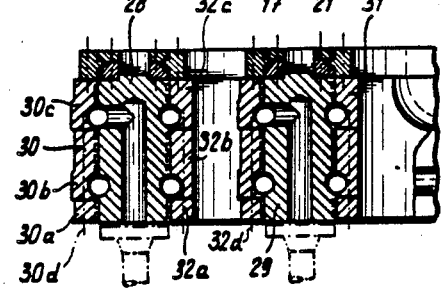
FIG. 3 is a vertical section through another form of construction of the pipe coupling according to the invention.

FIG. 3 shows an embodiment, and this FIG. is a section of only half a coupling. The rotatable pipe coupling shown in FIG. 3 has two stationary annular bodies 28 and 29, a rotatable outer ring 30, a rotatable inner ring 31, and a rotatable intermediate ring 32. This embodiment has eight circumferential channels and can thus also connect eight incoming pipes to eight outgoing pipes. The connections on the stationary bodies can be made in the same way as in FIGS. 1 and 2 with the aid of axial bores, and the connections on the rotatable rings can be made in the outer ring in the manner shown in FIG. 2 and in the inner ring 31 in the same way as shown in FIGS. 1 and 2, while in the central ring 32 connections (not shown) are necessary to conduct the circumferential channels outwards in the axial direction in a manner comparable with the elbow-shaped connections in the inner ring.

FIG. 3 also shows that the outer ring 30 may consist of three rings 30a, 30b and 30c, laid one on the other, and that the inner ring 32 may consist of rings 32a, 32b and 32c. These rings are clamped to one another by short and long axial bolts respectively, as indicatd by the centre lines 30d and 32d of the bolts. In the event of leakage in a seal under the lowermost circumferential channel, the lowermost ring 30a or 32a can then be detached and moved downwards, so that the packings become accessible and can be replaced. The flow through the lowermost channel can then in certain circumstances pass through, or if this is not possible a repair can be made without dismantling pipe connections.

Leakage in the central packings entails removal of the rings 30a and 30b or 32a and 32b without dismantling mantling the pipe connections on the uppermost rings.

It is also conceivable for a ring, such as 30, to be made divisible in the peripheral direction.

Figure 4:
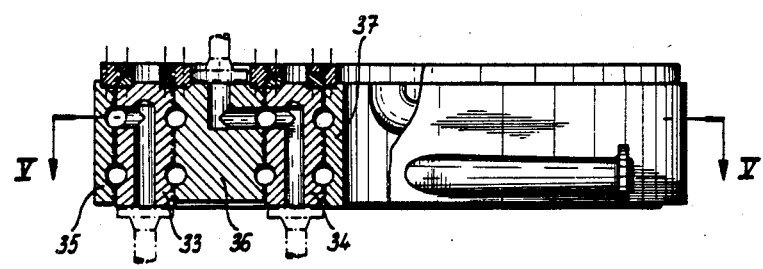
FIG. 4 is a vertical section, partly in elevation, on the line IV—IV in FIG. 5 through another form of construction.
Figure 5:
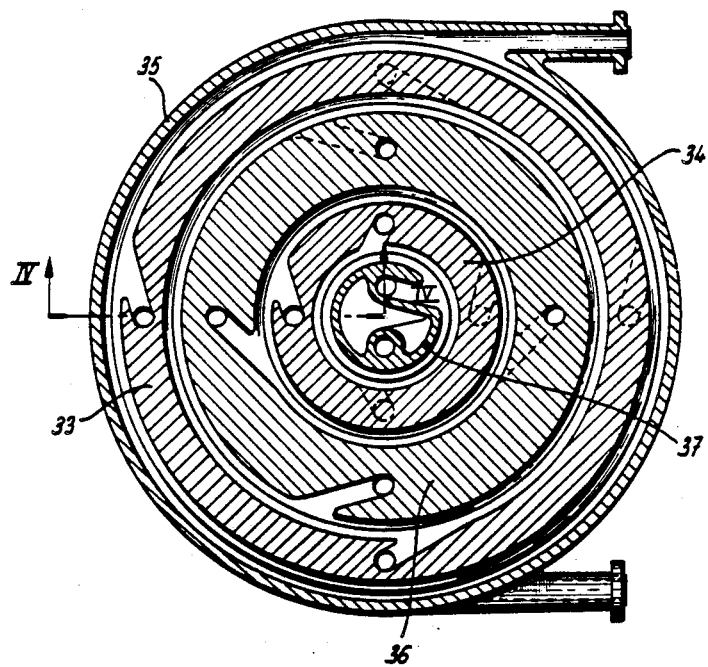
FIG. 5 is a section on the line V—V in FIG. 4.

FIGS. 4 and 5 show similarly to FIG. 1 an embodiment comparable to FIG. 3, with stationary rings 33, 34 and rotatable rings 35, 36 and 37. FIG. 4 shows how the connections between incoming and outgoing pipes can be made with the aid of radial bores and transverse connections.

In all these embodiments the parts rotatable in relation to one another are rotatable with the aid of roller bearings which are disposed above them and which are divisible and readily accessible.

From FIGS. 3 and 4 it can easily be deduced that for example the central ring 36 can be removed axially after removal of the appertaining bearings, without anything needing to be modified in the construction and functioning of the other rings.

Figure 6:
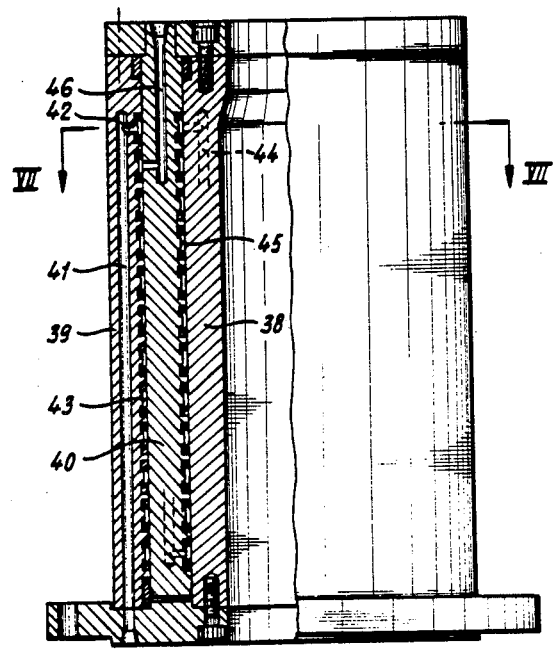
FIG. 6 is a vertical section on the line VI—VI in FIG. 7.
Figure 7:
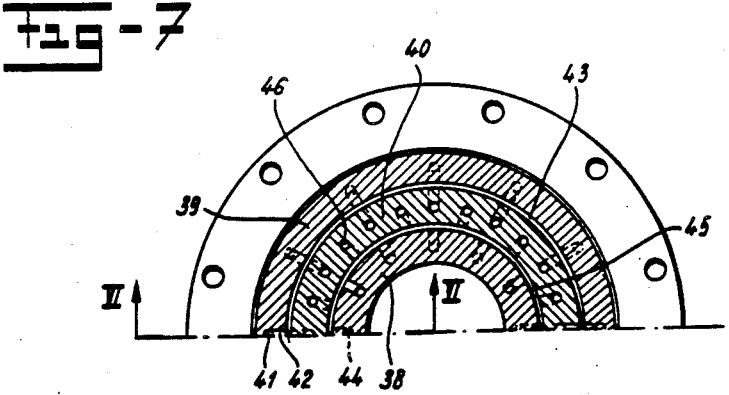
FIG. 7 is a horizontal section on the line VII—VII in FIG. 6.

Finally, FIGS. 6 and 7 show an embodiment for a large number of pipes.

In this embodiment the inner ring 38 and outer ring 39 are stationary. The intermediate ring 40 is rotatable The outer ring 39 has twelve axial bores 41, which via transverse bores 42 are connected at twelve different levels to circumferential channels 43. The inner ring 38 likewise has twelve axial bores 44, which are connected in comparable manner to circumferential channels 45. The rotatable intermediate ring 40 has twenty-four axial bores 46, twelve of which are connected at different levels to the circumferential channels 45, while twelve are connected on the outside to the circumferential channels 43.

We claim:

1. A rotatable coupling for a plurality of incoming and outgoing pipes, comprising at least three annular bodies having a common central axis and each having a plurality of pipe connections, at least one of said bodies being rotatable relative to at least one stationary said body about said axis, said bodies being disposed concentrically with respect to one another in a common plane perpendicular to said axis, and means to retain said bodies in said common plane, said bodies being sealingly connected to one another by mutually facing cylindrical surfaces which over their entire axial length have a substantially constant diameter, of which cylindrical surfaces at least one of each pair of facing surfaces is provided with a plurality of recesses forming circumferential channels communicating with incoming and outgoing pipes and sealing rings positioned between said facing surfaces sealingly separating said channels from one another.

2. Rotatable coupling as claimed in claim 1, comprising one said stationary body, a said rotatable body outside said stationary body and a said rotatable body inside said stationary body.

3. Rotatable coupling as claimed in claim 1, comprising two said stationary bodies one concentric inside the other with a said rotatable body between the two stationary bodies, a said rotatable body outside the outermost stationary body and said rotatable body inside the innermost stationary body.

4. Rotatable coupling as claimed in claim 1, comprising two said stationary bodies and one said rotatable body located between the two stationary bodies.

5. A rotatable coupling for a plurality of incoming and outgoing pipes, comprising at least three annular bodies having a common central axis and each have a plurality of pipe connections, at least one of said bodies being rotatable relative to at least one stationary said body about said axis, said bodies being disposed concentrically with respect to one another in a common plane perpendicular to said axis, and means to retain said bodies in said common plane, said bodies being sealingly connected to one another by mutually facing cylindrical surfaces, of which cylindrical surfaces at least one of each pair of facing surfaces is provided with a plurality of recesses forming circumferential channels communicating with incoming and outgoing pipes and sealing means positioned between said facing surfaces sealingly separating said channels from one another, a said body intermediate two other said bodies having a plurality of passageways therein parallel to said axis, some of said passageways communicating with said channels on the outer side of said intermediate body and others of said passageways communicating with said channels on the inner side of said intermediate body.

* * * * *